United States Patent
Ehrenberger et al.

(10) Patent No.: US 6,312,036 B1
(45) Date of Patent: Nov. 6, 2001

(54) CARGO SPACE COVERING OR HAT HOLDING PIECE WITH MOVABLE CORNER PIECES

(75) Inventors: Marina Ehrenberger, Esslingen; Herbert Walter, Ebersbach, both of (DE)

(73) Assignee: BOS GmbH & Co. KG (DE)

( * ) Notice: Subject to any disclaimer, the term of this patent is extended or adjusted under 35 U.S.C. 154(b) by 0 days.

(21) Appl. No.: 09/601,863

(22) PCT Filed: Dec. 9, 1999

(86) PCT No.: PCT/DE99/03933

§ 371 Date: Sep. 25, 2000

§ 102(e) Date: Sep. 25, 2000

(87) PCT Pub. No.: WO00/34078

PCT Pub. Date: Jun. 15, 2000

(30) Foreign Application Priority Data

Dec. 9, 1998 (DE) .............................. 198 56 741

(51) Int. Cl.[7] .................................. B60R 27/00
(52) U.S. Cl. ........................ 296/37.16; 296/37.1
(58) Field of Search ................ 296/37.15, 37.16, 296/37.8, 37.1, 98; 160/238, 370.22, 23.1; 16/386, 388

(56) References Cited

U.S. PATENT DOCUMENTS 3,446,526  5/1969  Peters .
4,671,557 * 6/1987  Lemp ............................. 296/37.16
5,038,437 * 8/1991  Russell et al. ................... 16/388 X
5,857,725 * 1/1999  Croke et al. .................... 296/37.16

FOREIGN PATENT DOCUMENTS

| 19707676C | 2/1998 | (DE) . |
| 0066514A | 12/1982 | (EP) . |
| 2395861 | 1/1979 | (FR) . |
| 2686301A | 7/1993 | (FR) . |

* cited by examiner

Primary Examiner—Joseph D. Pape
Assistant Examiner—Lori L. Coletta
(74) Attorney, Agent, or Firm—Leydig, Voit & Mayer, Ltd.

(57) ABSTRACT

A hat holding piece piece (19) is composed of three sections, a middle section (31) and two corner pieces (32, 33) which are laterally hinged on the middle section (31). The corner pieces (32, 33) can be swung with the aid of the hinge so that in the region of the corner pieces (32, 33) the width of the hat holding piece (19) can be reduced by the swinging downward of these corner pieces (32, 33). In this manner the different clear width of the automobile body is taken into account, which as a rule is greater below the side windows than at a place located nearer to the roof.

A cargo space covering has a molded part which likewise consists of three sections, a middle piece and two corner pieces. The corner pieces are likewise joined opposite hinges with the middle piece by means of hinges. Thereby it is to be possible to reduce the width of the molded part when, in the swinging-up of the cargo space covering it passes into the region of the body work in which the spacing between the inner sides is less than below the lower edge of the side windows.

47 Claims, 8 Drawing Sheets

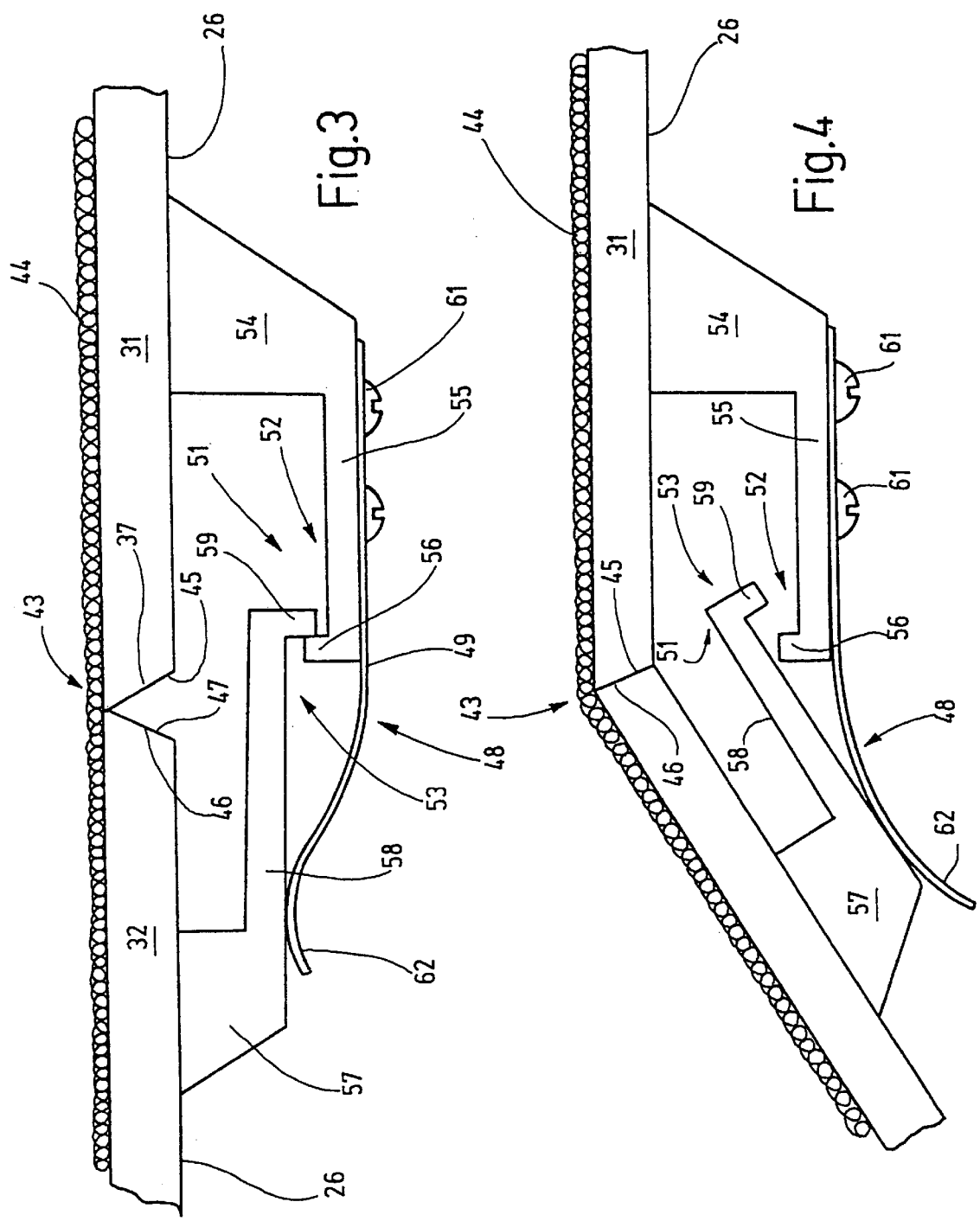

CARGO SPACE COVERING OR HAT HOLDING PIECE WITH MOVABLE CORNER PIECES

FIELD OF THE INVENTION

The invention generally relates to cargo space coverings and rear storage shelf assemblies (or hat holding pieces) for automobiles.

BACKGROUND OF THE INVENTION

In compact passenger cars that have the form of small station wagons the hat holding piece extends from the rear edge of the rear seat back to the rear hatch. In order to facilitate the access of the cargo space underneath the hat holding piece, the hat holding piece is hinged beside the rear seat back in the automobile body. By reason of this hinge the hat holding piece can be moved from a horizontal position in which it rests on lateral supports, into an upright position. This takes place automatically in the opening of the rear hatch with the aid of pull cords or other coupling elements that connect the rear hatch with the hat holding piece in the vicinity of its rear edge.

In modern automobiles the body that forms the roof section is relatively strongly drawn in, which leads to the result that the rear hatch opening and the clear space between the side walls or side windowpanes the in upward direction, is correspondingly strongly tapered. The tapering of the rear window opening is further reinforced if the automobile body is strongly rounded in the zone of the C-pillars, as corresponds to the modern trend. Since simultaneously the rear hatch opening runs obliquely, the swung-up hat holding piece emerges with its rear edge zone out of the cargo space opening.

So that the swung-up hat holding piece will not collide with the side windowpanes or C-pillars, it must be made correspondingly narrow. This in turn demands filling pieces be included inside the automobile body laterally underneath the rear side windowpanes. The filling pieces on their part impair the free loading volume when, for the enlargement of the cargo space, the hat holding piece is taken out and the rear seat back is reversed.

Essentially similar relations are present in the case of station wagons when their cargo space is closed with a cargo space covering. The cargo space covering has in connection to the roller curtain a rigid contour or molded part, the outer edge of which roughly follows a girdle or equatorial line which is defined by an imaginary section line. The section is defined by an imaginary horizontal plane through the extended roller curtain and the inside of the cargo-space or rear hatch lining.

It is a known practice, for example from DE-A-37 25 545, to swing the cargo space covering obliquely upward simultaneously with the opening of the rear hatch, in order to save the user from the necessity of having to let the cargo space covering run back into the roller housing.

The contour part in the known arrangement is a table shaped surface structure which, if its width is greater than the rear hatch opening, cannot be drawn out by the rear hatch as it is lifted. Hereby there arise considerable restrictions, and the coupling between the rear hatch and the cargo space covering is complicated, because it is not possible to fasten the rear edge of the loading space covering to the rear hatch simply with the aid of pull cords, in the manner that is known from small compact passenger cars for the raising of the hat holding piece. Also cargo space covers for this reason require as a rule filler pieces underneath the rear side windows in order to restrict the width of the roller curtain, inclusive of the contour part, to a measure such that collisions are prevented between the contour part and the edge of the cargo space opening in the drawing-out of the contour part from the cargo space openings.

OBJECTS AND SUMMARY OF THE INVENTION

Accordingly, in view of the foregoing, a general object of the present invention is to provide a hat holding piece (i.e. a rear storage shelf) or cargo space covering for an automobile having a width which is not limited by the width of the rear hatch opening of the automobile.

The present invention provides these and other advantages and overcomes the drawbacks of the prior art by providing a rear storage shelf assembly (i.e. hat holding piece) or cargo space covering having pivotable corner pieces.

The new hat holding piece covers the space between the straight edge of the rear seat back and the inner contour of the rear hatch as well as the zones bounding thereon.

The hat holding piece consists of three parts, namely a middle piece that is borne directly swingably in the vehicle, as well as two side or corner pieces which are joined with the middle part over an appertaining hinge. By swinging the end pieces with respect to the middle part, the effective width of the middle part becomes smaller, so that with horizontally swung end pieces the middle piece can no longer become jammed between the side windows or the side walls, or collide with the edges of the rear hatch opening if from the opening of the hat holding piece a piece emerges far out of the rear hatch opening.

For example, the two corner pieces, which are preferably symmetrical with respect to the longitudinal axis of the vehicle, are hinged in such manner that they fold downward as the hat holding piece is raised. This downward folding can take place either by reason of their own weight if the hat holding piece is raised by corresponding car body-fast supports, or as the corner pieces collide with the edges of the rear opening and these edges press the corner pieces downward during further lifting. In the latter case, the corner pieces are prestressed by corresponding prestressing arrangements into a position in which they extend about at the level of the middle piece.

In the case of extremely rigid middle pieces, it can be expedient to provide the pieces with a desired bending zone which extends transversely to the vehicle longitudinal axis. Hereby, in the event of a rear impact, clipping of the front passengers by the middle piece can be prevented.

A particularly aesthetically attractive upper side of the hat holding piece is yielded if it has a continuous covering at least on the upper side of the middle piece. This covering can be, for example, a floor carpet, or a felt covering, or the like.

The corner piece can consist of two surface-type (flat) molded parts. In this case, the hinge has hinge bolts. These can be integral with molded parts at the ends of the middle piece.

If the hinge over which the respective cover piece is jointed with the middle piece is a film hinge, then the covering can be used directly.

The direction of the hinge axis is oriented essentially on the car body. Thus, the hinge axis can lie parallel to the vehicle longitudinal axis or it can run obliquely with respect to the vehicle longitudinal axis. In the latter case, the corner pieces have a roughly triangular shape with rounded outside lying corners corresponding to the car body.

The prestressing means for the upward pivoting of the corner pieces suitably comprise, in each case, suitably a leaf spring. This is to be accommodated in a space-saving manner and it only inappreciably increases the weight of the molded part means. Furthermore a prestressing means formed in this way does not appreciably increase the density of the molded part means. These could also be formed by a leg spring that is provided in the end piece.

In order to prevent the respective corner piece from being swung upward beyond a position in which this corner piece lies in a plane with the middle piece, stop means are provided. These stop means comprise in the simplest case two hooks gripping into one another that come into engagement with one another when the desired end position is reached. So that the hooks, in the swinging down of the end piece, will not hamper its movement, the hook mounted on the middle piece is set back in the direction toward the center of that middle piece.

The new cargo space covering has a housing means to be anchored in the motor vehicle. The housing can be a largely closed housing with only one outlet slot, or it can be restricted to two end caps joined with one another over a rod, which are anchored in the vehicle. In any case the housing means serve for the turnable bearing of a winding shaft to which with one edge of the roller curtain is fastened. The edge lying away from the winding shaft of the roller curtain is joined with a formed or contoured part, which connects to the straight edge of the roller curtain and, in the broadest sense to the about half-moon-shaped space between the straight edge of the roller curtain and the inner contour of the rear hatch, as well as to the zones bounding thereon.

The molded part means itself, which fills this interspace in the expanded state of the cargo space covering, consists of three parts, namely a middle piece that is directly connected with the roller curtain, as well as two side or corner pieces which are joined with the middle part over a hinge. By swinging down the corner pieces with respect to the middle part, the effective width of the middle part means decreases, which, with swung down corner pieces, no longer collides with the edges of the rear hatch opening if, in the opening of the rear hatch this molded middle part means is drawn out at least a little from the rear hatch opening. For example, the two corner pieces, which are preferably symmetrical with respect to the longitudinal axis of the vehicle, can be hinged-on in such manner that in the raising of the drawn-out cargo space opening they fold downward. This downward folding can occur either by reason of their own weight, when the middle part means is lifted by corresponding body fastened supports or when the end pieces collide with the borders of the rear opening and these edges press down the corner pieces during further lifting. In the latter case, the corner pieces are prestressed by corresponding prestressing arrangements into a position in which they extend about in the plane of the middle piece, as is explained above in connection with the hat holding piece.

These and other features and advantages of the invention will be more readily apparent upon reading the following description of preferred exemplary embodiments of the invention and upon reference to the drawings wherein:

BRIEF DESCRIPTION OF THE DRAWINGS

FIG. 3 is a partial side view of the storage shelf of FIG. 1 showing the film hinge, stop arrangement, and prestressing arrangement;

FIG. 4 is a partial side view of the storage shelf of Fig, 1 showing the corner piece swung downward;

While the invention will be described and disclosed in connection with certain preferred embodiments and procedures, it is not intended to limit the invention to those embodiments. Rather it is intended to cover all such alternative embodiments and modifications as fall within the spirit and scope of the invention.

DETAILED DESCRIPTION OF PREFERRED EMBODIMENTS

Figure 1:
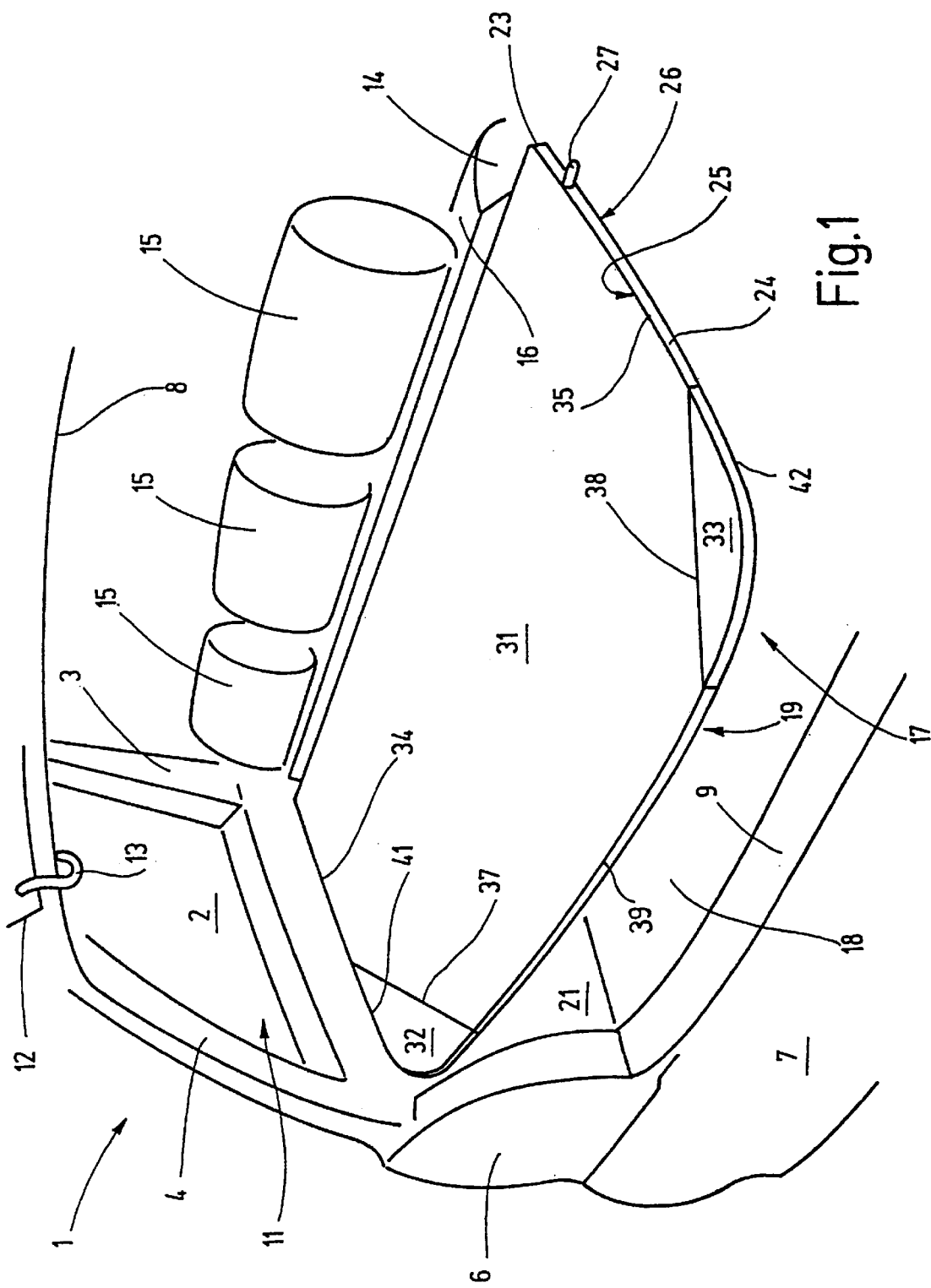
FIG. 1 is a partial view of an illustrative compact passenger car having a hat holding piece or rear storage shelf in accordance with the invention showing the storage shelf in a laid flat position.

FIG. 1 shows schematically a broken-open rear section 1 of a compact passenger car. Of the rear section 1 there can be seen a left rear side window 2, a B-pillar (column) 3 as well as a C-pillar 4. Underneath the C-pillar 4 there is located a combined blinker-taillight arrangement 6, under which there runs a bumper 7.

On the broken-off side and consequently not to be seen in FIG. 1, there are present likewise a B-pillar, a rear side window as well as a C-pillar in a mirror-image arrangement. Between the two C-pillars 4 there runs a roof rear edge 8 which, simultaneously together with the C-pillars 4 and a cargo space lower edge 9, bounds a rear hatch opening 11. The C-pillars converge upward and lie obliquely.

A rear hatch closing the rear hatch opening 11 is to be perceived only by indication at 12 in FIG. 1. The rear hatch 12 is hinged with the aid of two hinge bands 13 on the underside of the roof rear edge 8. Because of the broken-open representation of the two hinge bands, only the left hand one is shown.

At a distance from the rear hatch opening 11 there is located within the rear section 1 a rear seat backrest 14 with headrests 15 standing on it. The rear seat back 14 ends at an upper edge 16, where the headrests 15 are arranged.

The space between the back side of the rear seat back 14 and the rear hatch opening 11 forms a cargo space 17, which is bounded underneath by a cargo space floor 18.

The rear seat back 14, as is usual in compact passenger cars, can be swung out of its nearly vertical upright position shown in FIG. 1, into a horizontal position, in order to increase the cargo space 17 at the expense of the passenger space present in front of the rear seat back 14.

With rear seat back 14 in the upright position the cargo space as seen in the longitudinal direction of the vehicle, is restricted to the region between the rear hatch opening 11 and the back of the rear seat back 14. Since the cargo space as a rule is also not fully needed in the vertical direction, it is covered over above by a hat holding piece in the form of a rear storage shelf 19.

The hat holding piece 19 rubs about horizontally in the rest state, and closes the opening that is bounded by the closed rear hatch 12, the side walls 21 of the cargo space 17 as well as by the rear side of the rear seat back 14.

The hat holding piece 19 correspondingly has a substantially straight front edge 23 that runs parallel to the back of the rear seat back 14, as well as a contoured roughly arcuate outer edge 24 which follows the inner form of the side walls 21 and the inside of the rear hatch 12. Its upper side 25 is essentially flat and runs parallel to its underside 26.

Figure 2:
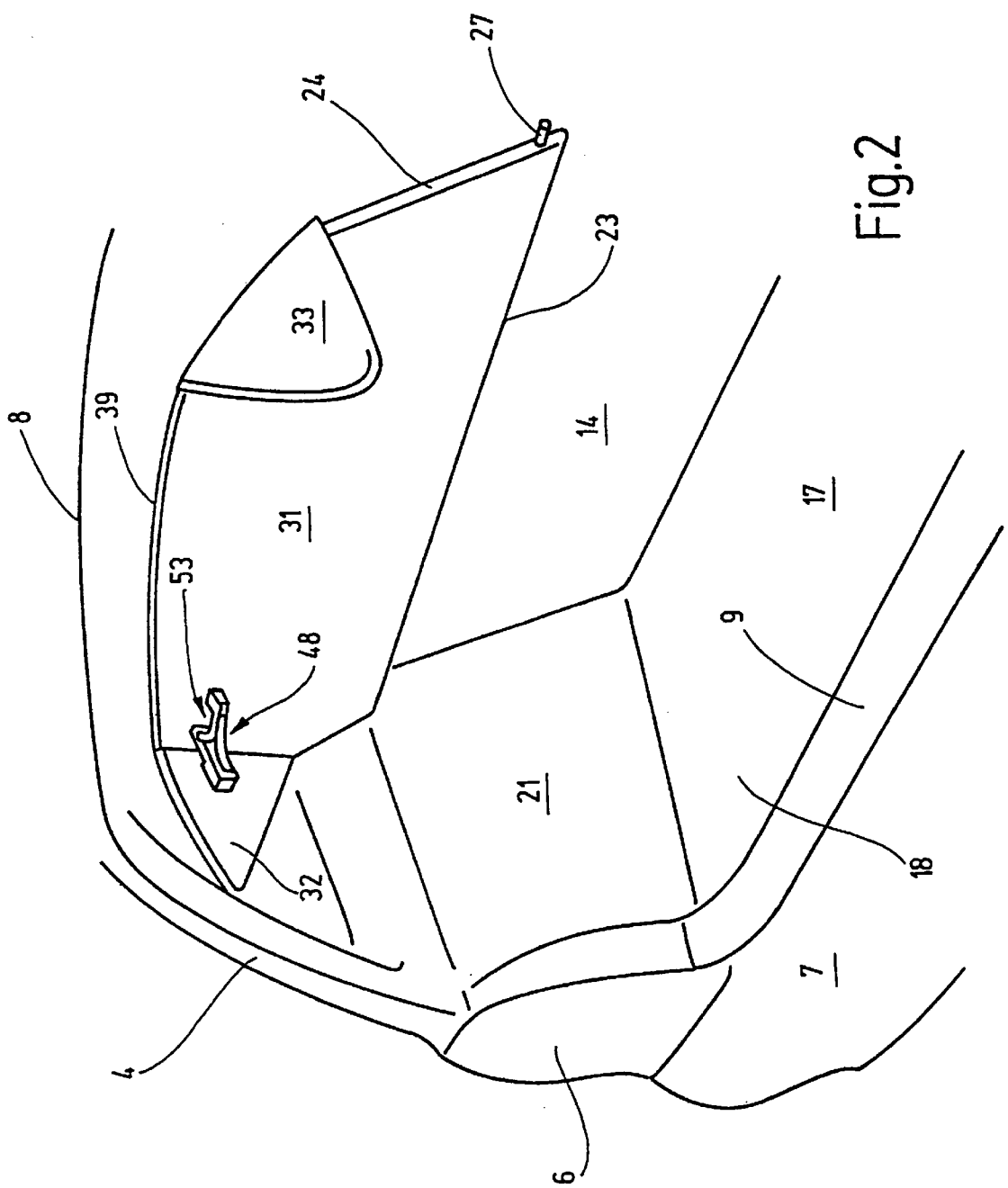
FIG. 2 is a partial rear perspective view showing the storage shelf of FIG. 1 in a raised position.

In the vicinity of the front straight edge 23, the hat holding piece 19 is provided with two laterally projecting bearing pins 27, of which, because of the representation, only the right hand one is shown. The two bearing pins 27 lie on a common axis and are received in imperceptible bearing blocks which are located in the corresponding location in the automobile body. In this manner, the hat holding piece 19 can be swung about a horizontally running axis parallel to the transverse axis of the vehicle, out of the horizontal position shown in FIG. 1 and into a swung-up position shown in FIG. 2.

Since the clear spacing inside the rear section 1 is smaller in each zone in which the rear edge of the hat holding piece 19 is present, when it is swung up, as compared with the clear distance with a horizontally running hat holding 19, the hat holding piece 19 is variable in its width at least in the area of its rear edge, therefore in that section of the peripheral edge 24 that runs about parallel to the front edge 23. For this purpose the hat holding piece 19 is composed of a rigid, say an hexagonal middle piece 31, and of two corner pieces 32, 33, likewise rigid, hinged on the middle piece 31.

The middle piece 31 is formed by the straight front edge 23, two edges 34 and 35 following the inner contour of the two side walls 21, two straight, but obliquely running edges 37, 38 and one edge 39, which again follows the course of the rear hatch 12 at the level of the hat holding piece 19. The edges 37 and 38 converge toward the rear hatch 12.

While the edges 34, 35 and 39 are sections of the peripheral edge 24 of the hat holding piece 19, the two edges 37 and 38 cut off the corners, as it were.

The edge 37 the corner piece 32 begins with a corresponding edge, the outer edge 41 of which completes the missing area of the outer edge 24. Analogously the same thing holds for the corner piece 33 with its outer edge 42.

The connection of the corner piece 32 with the middle piece 31 is seen in FIG. 3. The two parts are joined with one another over a film hinge 43. The film hinge 43 is formed by a covering 44, for example a felt cloth or a floor-covering type carpet, which covers the entire upper side 25 of the hat holding piece 19.

In order to enable swinging movement of the corner piece 32, the middle piece 31 is provided along the edge 37 with a bevel 45, just as is the corner piece 32 on its side edge 46 is provided with a bevel 47. Hereby there arise two bevel surfaces 45 and 47 that converge in the direction toward the covering 44, which enclose an acute angle with the upper side 25 both of the middle piece 31 and also of the corner piece 32. About the axis of the film hinge 43, i.e. about the upper edge of the surface 45 or about the edge 37, the corner piece 42 can be folded downward until the two surfaces 45 and 47 lie one upon another, as shown in FIG. 4.

A prestressing device 48, essentially in the form of a leaf spring 49, provides that the corner piece 32 is pressed upward against the action of gravity. In order to prevent the leaf spring 49 from pressing the corner piece 32 upward higher than necessary, a stop arrangement 51 is provided. The stop arrangement 51 comprises two hooks 52 and 53. The hook 52,consists of a foot part 54 which is mounted on the underside 26 of the middle piece 31 at a distance from the edge 37. On the end of the foot part 54 lying away from the underside 26, an arm 55 is molded in one piece, which points in the direction of the corner piece 32. This arm 55 carries on its free end a continuation 56 pointing to the underside 26, so that the arm 55 together with the continuation 56 forms the hook 52.

A foot part 57 is associated with the hook 53 which is mounted on the underside 26 of the corner piece 32, on the free end of which (foot part) that lies away from the underside 26, an arm 58 protrudes in the direction of the hook 52. On its free end the arm 58 is provided with a continuation 59 pointing away from the underside 26. The two hooks 52 and 53, as is shown in FIG. 3, are positioned in such manner that they collide with their continuations 56 and 59 when the corner piece 32 is directed as a straight extension of the middle piece 31. A further swinging-up of the corner piece 32 about the axis of the film hinge 43 is blocked by the engagement of the continuation 59 on the continuation 56. According to this, the two parts are joined with one another over a film hinge 43. The film hinge 43 is formed by a covering 44, for example a felt cloth or a floor-covering type carpet, which covers the entire upper side 25 of the hat holding piece 19.

In order to enable the swinging of the corner piece 32, the middle piece 31 is provided along the edge 37 with a surface 45, just as is the corner piece 32 on its side edge 46. Hereby there arise two level surfaces 45 and 47 that converge in the direction toward the covering 44, which enclose an acute angle with the upper side 25 both of the middle piece 31 and also of the corner piece 32. About the axis of the film hinge 43, i.e. about the upper edge of the surface 45 or about the edge 37, the corner piece 42 can be folded downward until the two surfaces 45 and 47 lie one upon another, as shown in FIG. 4.

A prestressing device 48, essentially in the form of a leaf spring 49, provides that the corner piece 32 is pressed upward against the action of gravity. In order to prevent the leaf spring 49 from pressing the corner piece 32 upward higher than necessary, there a stop arrangement 51 is present. The stop arrangement 51 comprises two hooks 52 and 53. The hook 52,consists of a foot part 54 which is mounted on the underside 26 of the middle piece 31 at a distance from the edge 37. On the end of the foot part 54 lying away from the So that in the folding-down of the corner piece 32 according to FIG. 4 the hook 53 does not collide with the free end of the arm 55, the hook 52 is set back with respect to the film hinge 43.in the direction of the middle of the middle piece 31. In other words, the two continuations 56 and 59 are set back with respect to a vertical plane that contains the axis of the film hinge 43.

On the downward facing side of the arm 55 the leaf spring 49 is screwed by means of two fastening screws 61, while its freely extending end 62 presses against the arm 58 of the hook 53.

The arrangement, as it is explained with the aid of FIGS. 3 and 4 in connection with the left corner piece 32, holds analogously for the right hand corner piece 33. A further explanation, consequently, is superfluous.

The hat holding piece 19 is joined with the rear hatch 12 in a known manner by means of cords; these cords, in the interest of clarity, are not shown in the drawing.

The functioning of the hat illustrated holding piece 19 is as follows:

In the normal rest position with the rear hatch closed, the hat holding piece 19 extends horizontally; i.e, its essentially flat upper side 25 defines a horizontal plane. It closes the opening to be seen above through the side window 2 of the cargo space 17, which is bounded by the back of the rear seat back 14, the two side walls 21 and the rear hatch 12. As a result of the modem retracted contour, the clear space between the side walls 21, at a level that corresponds to the rest position of the hat holding piece 19 shown in FIG. 1, is greater than is the case in an area lying nearer to the roof rear edge 8 between the two C-pillars 4.

When the user opens the rear hatch 12 in order to obtain access to the cargo space 17, automatically with the raising of the rear hatch 12 the hat holding piece 19 is also raised. For this the hat holding piece 19, for example in the area of the edge 39, is joined with the rear hatch 12 by means of pull cords (which in the interest of clarity are omitted in the figures). The raising of the rear hatch 12 leads to the result that the hat holding piece 19 swings upward about the bearing pins 27 into the position according to FIG. 2. Here, its rear area comes into an area between the C-pillars 4 or between the side windows 2, in which the clear spacing is less than below the side windows 2. In the course of this upward movement, the corner pieces 32 and 33 for this reason strike against the inside of the C-pillars 4 or against that of the side windows 2, and they are pressed downward counter to the action of the prestressing arrangement 48. Here they swing downward about the axes of the film hinges 44. The axes of the film hinges 44 correspond to the edge 37 where it issues into the upper side 25.

By reason of the corner pieces 32 and 33 which can move downward and thereby lead to an apparent reduction of the width of the hat holding piece 19 in the region of its rear edge, the width of the hat holding piece 19 can be so dimensioned that it almost completely utilizes the space between the two side walls 21, underneath the two side windows 2. It is not necessary to install filler pieces laterally in order to reduce the width of the hat holding piece 19 to the width that corresponds to the spacing between the body-side parts at the point at which the rear region of the hat holding piece 19 comes to lie in the swung-up state.

It is obvious that the swingable corner pieces 32 and 33 are also advantageous when, in the swinging-up of the hat holding piece 19, the latter's rear region (with respect to the normal nomenclature on the vehicle) emerges to the rear from the rear opening 11.

In the closing of the rear hatch 12, the hat holding piece 19 coupled with it likewise moves downward into an area in which the spacing between the C-pillars 4 or the adjoining zones becomes increasingly greater. In correspondence to the increasing distance, the end pieces 32 and 33, by means of the prestressing arrangement 48, again swing upward until the two hooks 52 and 53 of the stop arrangement 51 come into engagement with one another and block any further pressing-up of the end pieces 32 and 33. With the closing of the rear hatch 12 the position to be seen in FIG. 1 is again reached, in which the upper side of the corner pieces 32 and 33 extends in the same plane as the upper side of the middle piece 31.

With strongly forward-inclined C-pillars 4 the hat holding piece 19 is held down by the correspondingly inclined rear hatch 12 if, in a crash, objects press from underneath against the hat holding piece 19. With a more steeply standing rear hatch 12, the same effect can be achieved, as inward-mounted facing continuations are mounted on its inside at the corresponding height.

Figure 5:
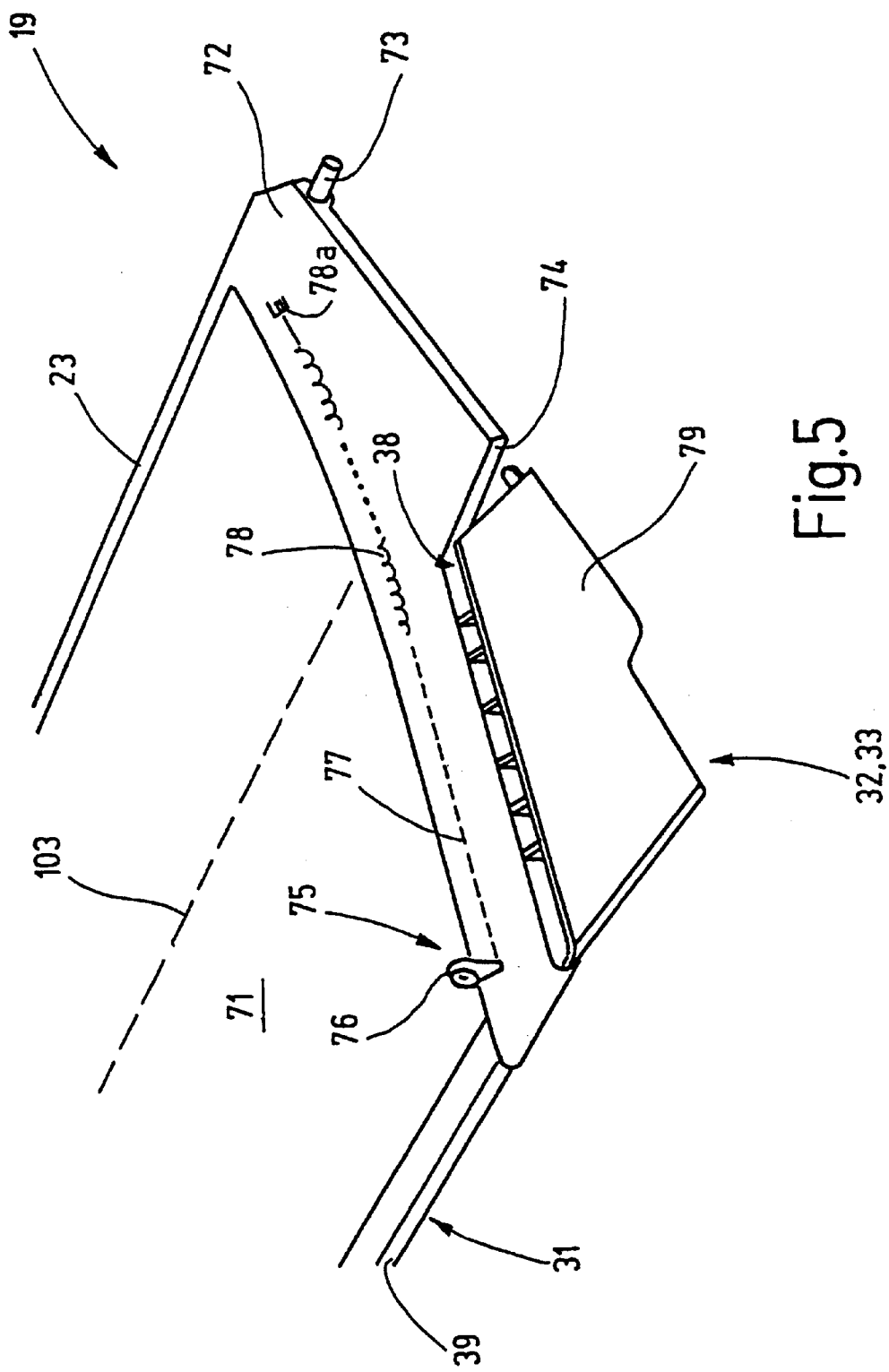
FIG. 5 is a partial perspective view of an alternative embodiment of a storage shelf according to the present invention.

In FIG. 5 there is shown a broken-off perspective representation of another embodiment of the hat holding piece 19; the view showing the right end. In this embodiment, insofar as it is a matter of components that are already explained in connection with the preceding example of execution, the same reference numbers are used and they are not described again.

The hat holding piece 19 consists again of a middle piece 31 on which two corner pieces 32, 33 are hinged. Because the representation is broken-off, in FIG. 5 only one corner piece is shown. The middle piece 31 is made up of a central part 71 in the form of a sheet metal cut-out, on which there is stretched a felt or fleece cloth. On the underside, the central part can be reinforced by struts that run parallel to the longitudinal axis of the vehicle. Because of the representation, the struts are not visible.

On the end side, two plastic molded parts 72 are fastened to the central part 71. The plastic molded part 72 contains, beside the front edge 23, a bore in which an hinge bolt 73 is led slidably in the longitudinal direction, such that the bolt represents a hinge shaft about which the hat holding piece is swung upward on opening of the rear hatch 12. The hinge bolt 73 is to be withdrawn against the action of a spring into the plastic molded part 72, in order to remove the hat holding piece 19 from the vehicle. The hinge bolt 73 extends parallel to the front edge of the hat holding piece 19 which is adjacent to the rear seat back 14.

On the oppositely lying end, the plastic molded part forms a cutout 74, in which the corner piece 33 is to be swung.

In order to also raise the hat holding piece 19 automatically in the opening of the rear hatch 12, a coupling means 75 is present, which is to be clipped with a connecting element in the form of a ball work pan 76 on a corresponding pivot of the rear hatch 12. The connecting element 76 is fastened to a free end of a draw cord 77 shown in broken lines, the other end of which is connected with a draw spring 78 which is rigidly joined at 78a with the middle piece 31. In the retracted state, the draw spring 78 and the draw cord 77 lie in a channel shown which is formed in the central part 71 underneath the plastic molded part 72. The draw cord 77 leads out of the channel and to the outside, through an opening in the upper side of the plastic molded part 72. The opening lies beside the edge 39. The corner piece on the other side is executed in mirror image.

Figure 6:
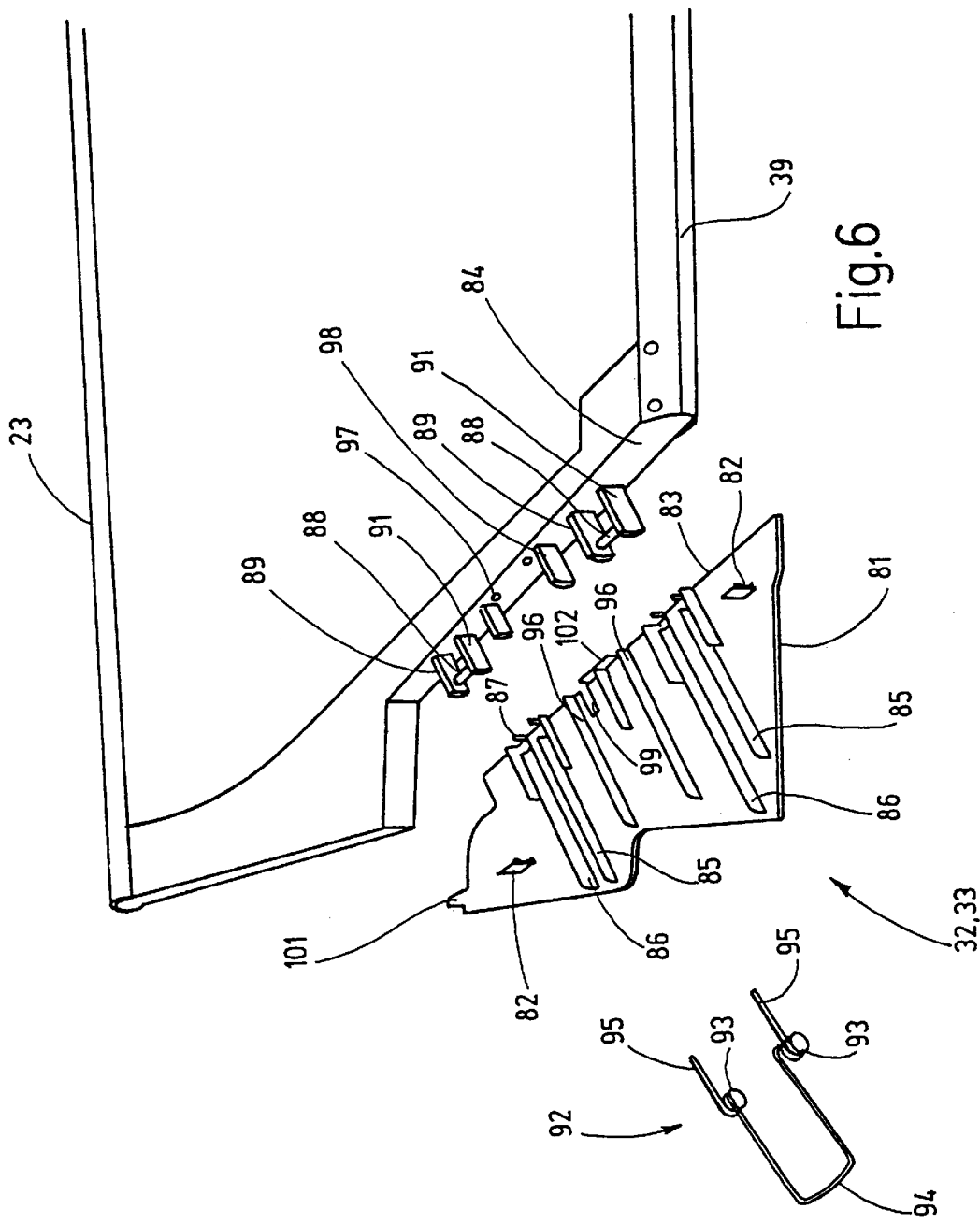
FIG. 6 is a partially exploded perspective view of a corner piece of the storage shelf of FIG. 5.

The type of connection of the plastic molded part 72 with the corner piece 33 is shown by FIG. 6, in which the left hand side of the hat holding piece 19 is illustrated.

The corner piece 33 likewise consists of a rigid plastic material and, particularly, it is formed of an upper and of lower plate, 79 and 81, respectively, which are essentially congruent and lie with spacing superficially opposite one another. By means of stop hooks 82 they are inseparably interlocked with one another. These stop hooks 82 correspond to, and are complementary to, the stop hooks 82 that are located on the underside of the upper plate-form part 79. Since this (underside) has no special structure aside from the stop hooks, a representation of the underside is unnecessary.

As FIG. 6 further makes evident, the lower plate-form part 81 is bounded by a straight edge 83, which simultaneously represents the edge of the corner piece 33 facing the longitudinal axis of the vehicle. It otherwise corresponds to a straight face edge 84 which, in the direction of the longitudinal axis of the vehicle, bounds the cutout 74 on the middle piece 31.

On the upper side or inner side of the plate-form part 31 a series of webs 85 and 86 are constructed, which run at a right angle to the edge 83 and extend up to this. In each case a web 85 and a web 86 form a web pair with relatively small spacing between them. One of these pairs is provided in the vicinity of the one end of the edge and the other is provided in the vicinity of the other end. In the vicinity of the edge 83, the webs 85 and 86 contain grooves or slots 87 open upward, with a half-round bottom. These slots 87 all lie on a straight line which extends parallel to the edge 83.

The grooves or slots 87 serve for receiving two hinge bolts or shafts 88. Each of the hinge shafts 88 is integrally joined with the edge of the front face 84, over a pair of lashes 89 and 91. The lashes 89, 88 and the hinge bolts 91 form a one-piece or integral component of the respective plastic molded part 72. The hinge bolts 88 lie on a common axis which extends parallel to the face surface 84.

The prestressing means for the lifting of the corner piece 33 consists of a leg spring 92 bent from wire. It forms two sections 93 wound in a screw-form coaxial to one another, which are joined at one end over a U-shaped yoke 94 and at their other end in each case and as a free wire end 95. The leg spring 92 is laterally fixed between two further webs running parallel to one another, while the free wire ends 95 extend into corresponding receiving openings 97 in the face surface 84. The screw-form sections 93 lie on the plate-form part 81; the U-shaped middle piece 94 is supported on the underside of the upper plate-form part 79.

For laterally fixing of the leg spring 92, two further lashes 98 are molded on the face side 84.

So that neither the lashes 89 and 91 nor the lashes 98 will collide with the lower plate-form part 81 when the corner pieces 32, 33 are swung downward, the lower plate-form part 81 contains, proceeding from the edge 83, several incisions 99 all but one of which is covered by the webs 85, 86 and 96. The incisions 99 correspond to the lashes 88, 89 and 98. Their depth corresponds about to the height of the respective lash.

In order to prevent the leg spring 92 from pressing the corner piece 33 upward beyond the horizontal position, a stop lug 101 is present. The above explanation holds analogously for both corner pieces 32, 33.

The assembling takes place as follows:

The prefabricated central part 71 is equipped on the end side with the plastic molded parts 72. Beforehand, the draw spring 78 and the draw cord 77 were installed in the corresponding guide channel, in which arrangement the draw cord 77 extends upward through the corresponding opening in the upper side of the plastic molded part 72. Thereupon, the lower plate-form element 81 is installed from below into the incision 74, and namely in such manner that the hinge shafts or bolts 88 come to lie in the appropriate pairs of slots or grooves 87. The leg spring 92 is then inserted with the free wire ends 95 into the openings 97, in which operation the spirally-wound sections 93 come to lie on a web 102 which is formed on the edge 82.

After this step the upper plate-form element 79, which is essentially congruent with the lower element 81, is snapped on, until the stop hooks 82 engage with one another and the two parts are unreleasably connected with one another.

In order to ensure an optimal bearing of the hinge bolts 88, further webs can be present on the underside of the upper plate-form part 79, which correspond to the webs 85 and 86 with the grooves 87. The semicircular arcs of the grooves 87 in the upper and the lower plate-form element 79, 81 can supplement one another in the mounted state into a circle, as seen in the direction parallel to the axis of the respective hinge bolt 88, while the webs lie laterally adjacent to one another.

As in the previous embodiment, the corner piece 33 is pressed upward by the leg spring which is supported with the U-shaped yoke 94 on the underside of the upper plate-form element 79. The pushing movement that the leg spring wants to impart on the corner piece 32, 33 is limited when the lug 101 strikes from underneath against the plastic molded part 72.

If the middle piece 31 is made very rigid (to bending), the danger is present that the passengers on the rear seats in the event of a rear collision can literally be beheaded. To prevent this, the middle piece 31 contains at least one desired bending place 103, as is indicated in broken lines in FIG. 5. Along this line, the middle piece 31 can bend particularly easily. In the event of a rear collision, the middle piece bends through and directs itself upward, so that the rigidity is largely lost.

Figure 7:
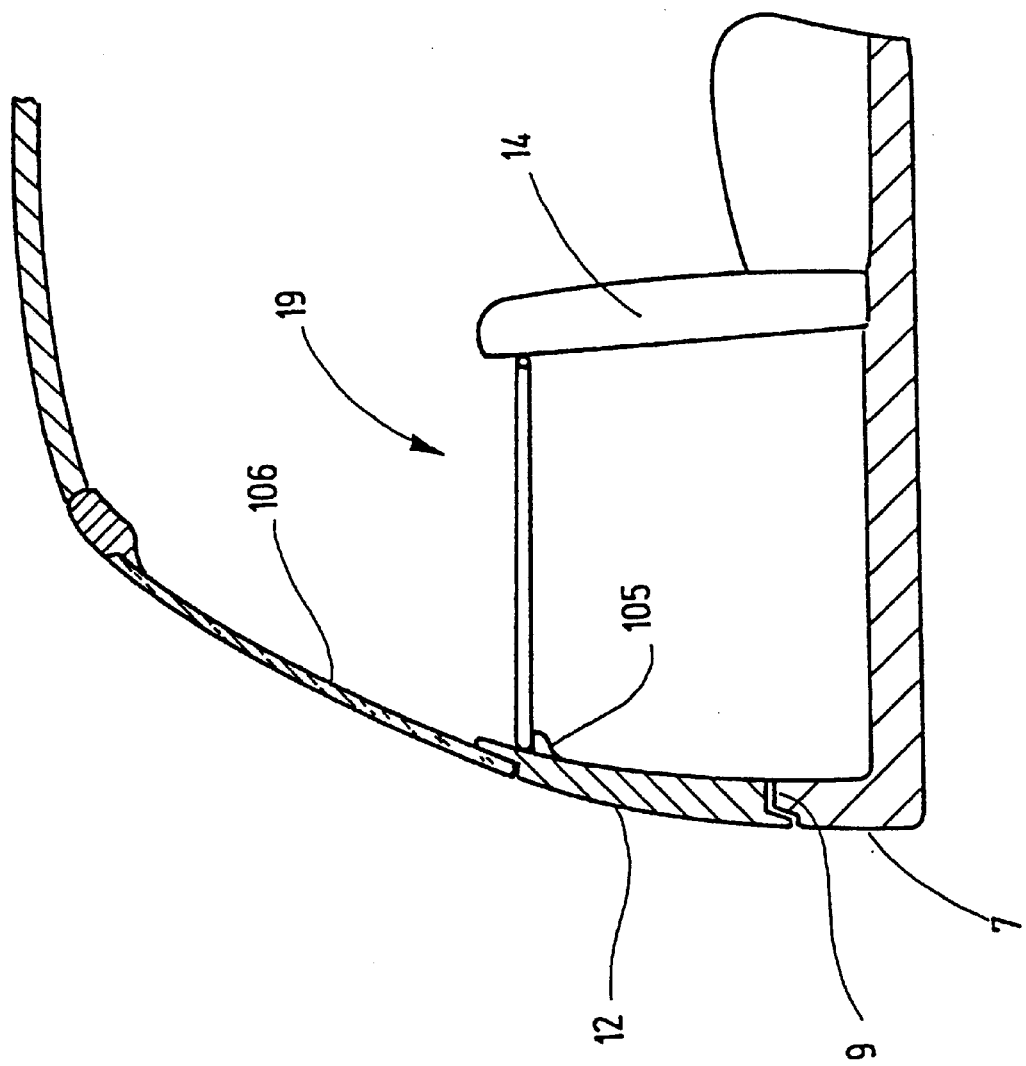
FIG. 7 is a side section view of a rear section of a passenger car showing the support of the storage shelf.

FIG. 7 illustrates a solution of how the carrying capacity of the hat holding piece 19 can be improved. For this there is assigned to the hat holding piece 19 at least one support bracket 105 which is fastened to the inside of the rear hatch 12, underneath its rear window 106.

The support bracket 105 is located, as far as possible, to the middle of the rear edge 39 of the middle piece 31. Hereby it is achieved that the hat holding piece 19 is supported not only beside the lateral edges, but also in the middle when the rear hatch is closed and the hat holding piece 19 is in its horizontal position.

Depending on the embodiment one or more support brackets 105 can be provided.

In the earlier-mentioned exemplary embodiments there is especially explained the use of movable corner pieces in connection with a hat holding piece in order to take into account the upward-tapering of car body shape. The use of movable corner pieces, however, is not restricted to hat holding pieces, but it can also occur in connection with cargo space coverings that are provided with a contoured molded part means.

Figure 8:
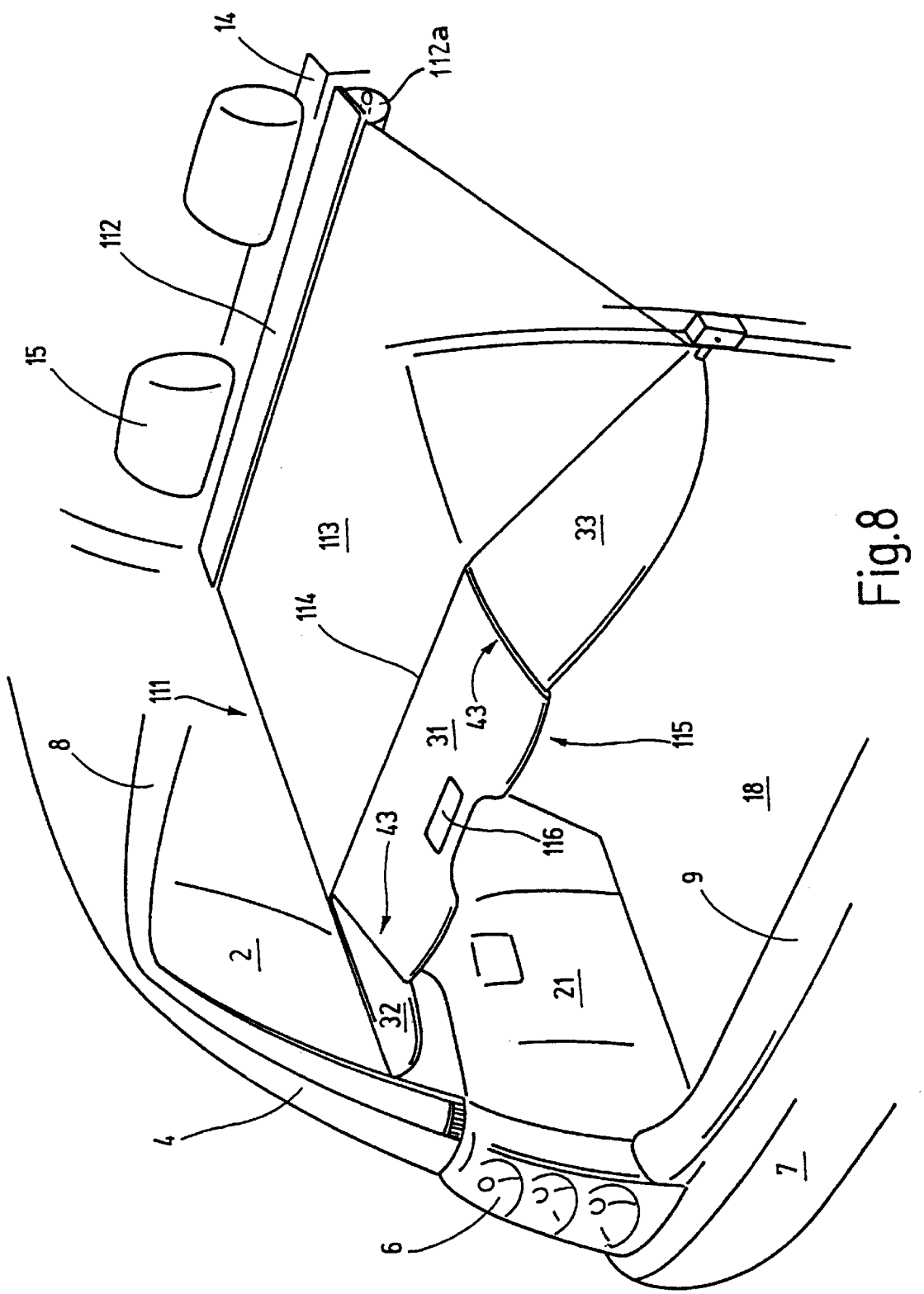
FIG. 8 is a partial rear perspective view of an illustrative station wagon having a cargo space covering according to the present invention showing the covering in a partly raised position.

FIG. 8 shows such an application in a station wagon, in which components that are already explained in connection with the preceding example of execution are provided with the same reference numbers and are not explained again. The cargo space covering 111 has a housing 112, which is fastened behind the rear side of the rear seat back. In the housing 112 there is a rotatably supported winding shaft 112, which is prestressed in one turning direction with the aid of a spring arrangement in a conventional manner. To the winding shaft there is fastened with one edge a roller curtain 113, the other edge 114 of which is connected with a contour part or molded piece means 115. The molded piece means 115 is again in three parts, and is composed of the middle piece 31 as well as of the two laterally hinged-on corner pieces 32 and 33. For the purpose of simple handling in the drawing out and resetting of the cargo space covering 111, in the middle part 31 there can additionally be formed a hand grip 116. The connection between the middle piece 31 and the corner pieces 32 and 33 occurs in the same manner as was explained thoroughly earlier in connection with the hat holding piece 19. Both the illustrated variants are possible.

For example, by means of the coupling arrangement, as it is explained in DE-A 196 50 775, a kinematic connection is established between the rear hatch 12 and the cargo space covering 111. Since this coupling arrangement in the present case is not an object of the invention, it is not further explained below. It suffices to know that with the drawn-out cargo space covering 111, i.e. with mounted roller curtain 1 13, an opening of the rear hatch 12 leads simultaneously to the result that the contour part 115 is raised along with it.

Figure 9:
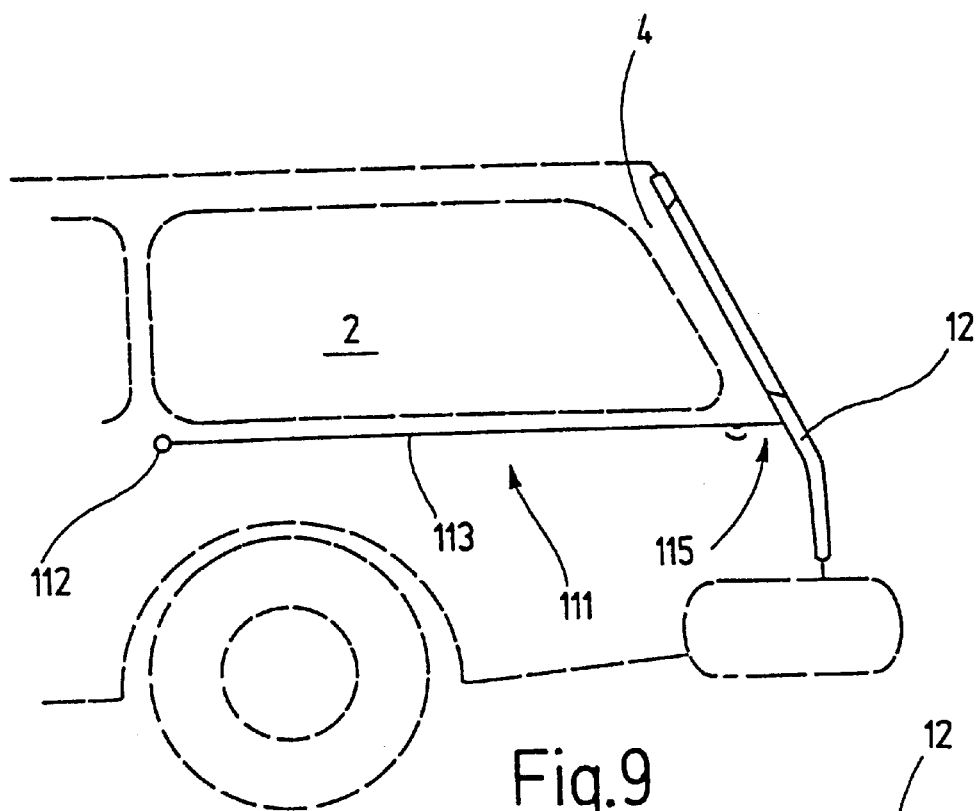
FIG. 9 is a schematic side view of the station wagon cargo space showing the position of the cargo space covering and the molded part assembly with the rear hatch of the station wagon closed.
Figure 10:
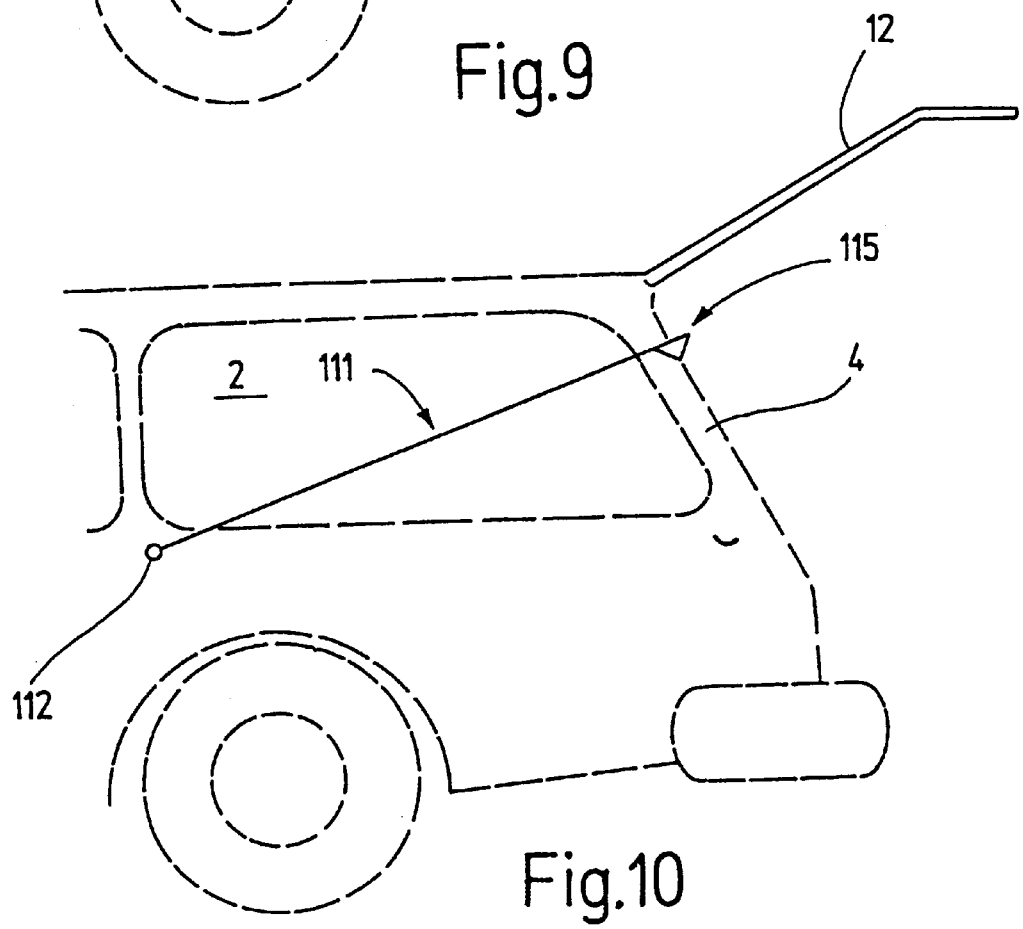
FIG. 10 is a schematic side view of the station wagon cargo space showing the position of the cargo space covering the rear hatch open.

FIG. 9 shows, highly schematized, the state with closed rear hatch 5. In this state, the roller curtain 113 is horizontally stretched and the contour part 115 follows directly onto the inside of the rear hatch 12. With the opening of the rear hatch 12, according to FIG. 10, the contour part 115 together with the roller curtain 113 is moved upward, whereby the roller curtain 113 executes a swinging movement with respect to the housing 112 as axis. Since the contour part 115 therewith moves into an area in which the clear spacing between the insides of the body work is smaller than in the rest state when the contour part 115 is present underneath the lower edge of the rear side windows 2, the corner pieces 32 and 33 of the contour part 115, as indicated in FIG. 10, are pressed downward.

A cargo space covering has a molded part which likewise consists of three sections, a middle piece and two corner pieces. The corner pieces are likewise joined with the middle piece by means of hinges. Thereby the width of the molded part can be reduced when, in the swinging-up of the cargo space covering, the molded part passes into the region of the car body where the distance between the inner sides is smaller than underneath the lower edge of the side windows.

They swing downward there about the axes of their film hinges 43.

Depending on the car body structure it can be sufficient if in the contour part 115 only the outer corners, similarly as with the hat holding piece 19, fold downward. But car body forms are also possible in which the hinge axis does not run obliquely to the body work longitudinal axis, but parallel to it, as is shown in FIG. 8.

A hat holding piece is composed of three sections, a middle section and two corner pieces that are laterally hinged on the middle section. The corner pieces can be swung with the aid of the hinge in order to reduce the width of the hat holding piece, by their swinging down, in the region of the corner pieces. In this manner, there is taken into account the different clear width of the car body below the windows, which as a rule is greater then the width at a point located nearer the roof.

A cargo space covering has a molded part which likewise consists of three sections, a middle piece and two corner pieces. The corner pieces are likewise joined with the middle piece by means of hinges. Thereby the width of the molded part can be reduced when, in the swinging-up of the cargo space covering, it (the molded part) passes into the region of the car body where the distance between the inner sides is smaller than underneath the lower edge of the side windows.

What is claimed is:

1. A rear storage shelf assembly for a passenger automobile or a station wagon having a cargo space bounded by a rear hatch and a normally upright rear seat back located forwardly of the rear hatch, the storage shelf assembly comprising:
   a storage shelf having an underside and an essentially flat upper side, the storage shelf being pivotably supported in the vehicle behind the rear seat back in such that the storage shelf is pivotable upward about a horizontal axis,
   the storage shelf being bounded by an outer edge which over a certain distance approximately follows a contour which is defined by a section line between a plane defined by the horizontally lying storage shelf and a path of the inner contour of the cargo space in the area of the rear hatch, said storage shelf having forward corners adjacent said rear seat and rearward corners adjacent said rear hatch, and
   the storage shelf being divided into a middle pieces and two corner pieces each of which is connected by a hinge to the middle piece and at least a part of an edge of each corner piece forms a section of the outer edge of the storage shelf which includes one of said rearward corners but not one of said forward corners.

2. The rear storage shelf assembly according to claim 1 wherein the middle piece has a rigid shape.

3. The rear storage shelf assembly according to claim 1, wherein the storage shelf has a continuous covering which covers uninterruptedly the middle piece and the two corner pieces.

4. The rear storage shelf assembly according to claim 3 wherein the covering is a carpet covering.

5. The rear storage shelf assembly according to claim 1, wherein each corner piece consists of an upper and a lower flat plastic molded part which are joined with one another.

6. The rear storage shelf assembly according to claim 1, wherein the hinges that connect the middle piece with the respective corner pieces are film hinges.

7. The rear storage shelf assembly according to claims 1, wherein the storage shelf has a continuous covering which covers uninterruptedly the middle piece and the two corner pieces and the hinges that connect the middle piece with the respective corner pieces are film hinges formed by the covering.

8. The rear storage shelf assembly according to claim 1, wherein the hinges between the middle piece and the corner pieces include hinge shafts.

9. The rear storage shelf assembly according to claim 8, wherein each hinge shaft comprises a single piece that includes lashes, the hinge shaft and lashes being formed as one-piece plastic molded parts.

10. The rear storage shelf assembly according to claim 8, wherein each of the hinges include hinge bearing pieces which are constructed as webs on the respective corner piece and contain grooves for receiving the hinge shaft.

11. The rear storage shelf assembly according to claim 10, wherein the webs are integrally formed with the respective corner piece.

12. The rear storage shelf assembly according to claim 1, wherein the corner pieces are pivotable in a downward direction.

13. The rear storage shelf assembly according to claim 8, wherein the hinge shafts extend obliquely to a longitudinal axis of the vehicle.

14. The rear storage shelf assembly according to claim 1, further including coupling mechanisms which are connected with the rear hatch so as to raise the storage shelf when the rear hatch is opened.

15. The rear storage shelf assembly according to claim 14, wherein the middle piece includes a channel for receiving each of the coupling mechanisms, a draw spring being provided in each of the channels to which the coupling mechanism is fastened at one end.

16. The rear storage shelf assembly according to claim 1, further including supports fastened to the rear hatch for supporting the middle piece when the rear hatch is in a closed position.

17. A cargo space covering assembly for a passenger automobile or a station wagon, which has a cargo space bounded by a rear hatch and a normally upright rear seat back located forwardly of the rear hatch, the cargo space covering assembly comprising:

a housing which is releasably mounted in the automobile, a winding shaft rotatably supported in the housing, a roller curtain fastened at one edge to the winding shaft for movement between a wound position and a drawn out position, and a molded cover section which is fastened to an edge of the roller curtain opposite from the winding shaft, molded section having an underside and an essentially flat upper side, the cover section being bounded by an outer edge which over a certain distance at least approximately follows a contour line of an inner contour of the cargo space in the area of the rear hatch in a plane defined by said roller curtain when in said drawn out position, the molded cover section including a middle piece and two corner pieces each of which is connected to the middle piece by a respective hinge and at least part of a peripheral edge of each corner piece forming a section of the outer edge of the molded cover section.

18. The cargo space covering assembly according to claim 17, wherein the middle piece is rigid in form.

19. The cargo space covering assembly according to claim 17, wherein each corner piece comprises an upper and a lower flat plastic molded part which are joined with one another.

20. The cargo space covering assembly according to claim 17, wherein the molded cover section includes a continuous covering which uninterruptedly covers the middle piece and the two corner pieces.

21. The cargo space covering assembly according to claim 20, wherein the cover is a carpet covering.

22. The cargo space covering assembly according to claim 17, wherein each of the hinges is a film hinge.

23. The cargo space covering assembly according to claim 17 wherein the storage shelf has a continuous covering which covers uninterruptedly the middle piece and the two corner pieces and the hinges that connect the middle piece with the respective corner pieces are film hinges formed by the covering.

24. The cargo space covering assembly according to claim 17, wherein each hinge is formed such that the respective corner piece is pivotable in a downward direction.

25. The cargo space covering assembly according to claim 24, wherein each hinge includes a hinge shaft.

26. The cargo space covering assembly according to claim 25, wherein each hinge shaft comprises a single piece that includes lashes, the hinge shaft and lashes being formed as one-piece plastic molded parts.

27. The cargo space covering assembly according to claim 25, wherein each of the hinges include hinge bearing pieces which are constructed as webs on the respective corner piece and contain grooves for receiving the hinge shaft.

28. The cargo space covering assembly according to claim 27, wherein the webs are integrally formed with the respective corner piece.

29. The cargo space covering assembly according to claim 17, wherein the axis of the hinges lies in the plane of the drawn-out roller curtain.

30. The cargo space covering assembly according to claim 17, wherein the hinges extend obliquely to a longitudinal axis of the vehicle.

31. The cargo space covering assembly according to claim 17, wherein the hinges extend parallel to a longitudinal axis of the vehicle.

32. The cargo space covering assembly according to claim 17, further including prestressing mechanisms for prestressing the corner pieces into a position in which an upper side of the respective corner piece runs extends from an upper side of the middle piece.

33. The cargo space covering assembly according to claim 32, wherein each prestressing mechanism is a leaf spring which is fastened to the middle piece.

34. The cargo space covering assembly according to claim 32, wherein each prestressing mechanism comprises a wound leg spring with two spring ends.

35. The cargo space covering assembly according to claim 34, wherein the leg spring has two spiral sections which are joined with one another by a U-shaped section, the U-shaped section being joined with the respective corner piece and the spring ends being joined with the middle piece.

36. The cargo space covering assembly according to claim 17, wherein a stop mechanism is provided which limits a movement of the corner pieces beyond a position in which an upper side of the respective corner piece extends from an upper side of the middle piece.

37. The cargo space covering assembly according to claim 36, wherein the stop mechanism includes first and second hooks, the first hook being fastened to a respective corner piece and the second hook being fastened to the middle piece, the first and second hooks are dimensioned such that they engage in one another when the upper side of the respective corner piece extends from the upper side of the middle piece.

38. The cargo space covering assembly according to claim 17, further including coupling mechanisms which are joined with the rear hatch in such manner that the molded cover section is raised on opening of the rear hatch.

39. A rear storage shelf assembly for a passenger automobile or a station wagon having a cargo space bounded by a rear hatch and a normally upright rear seat back located forwardly of the rear hatch, the storage shelf assembly comprising:

a storage shelf having an underside and an essentially flat upper side, the storage shelf being pivotably supported in the automobile behind the rear seat back in such that the storage shelf is pivotable upward about a horizontal axis, the storage shelf being bounded by an outer edge which over a certain distance approximately follows a contour which is defined by a section line between a plane defined by the horizontally lying storage shelf and a path of the inner contour of the cargo space in the area of the rear hatch, and the storage shelf being divided into a middle piece and two corner pieces each of which is connected by a hinge to the middle piece, at least a part of an edge of each corner piece forming a section of the outer edge of the storage shelf, and said middle piece having a preselected bending point which extends through the middle piece such that the middle piece will bend at the bending point in the event of a rear collision.

40. The rear storage shelf assembly according to claim 39 wherein said preselected bending point extends transversely to a longitudinal axis of the vehicle.

41. A rear storage shelf assembly for a passenger automobile or a station wagon having a cargo space bounded by a rear hatch and a normally upright rear seat back located forwardly of the rear hatch, the storage shelf assembly comprising:

a storage shelf having an underside and an essentially flat upper side, the storage shelf being pivotably supported in the automobile behind the rear seat back in such that the storage shelf is pivotable upward about a horizontal axis, the storage shelf being bounded by an outer edge which over a certain distance approximately follows a contour which is defined by a section line between a plane defined by the horizontally lying storage shelf and a path of the inner contour of the cargo space in the area of the rear hatch, and the storage shelf being divided into a middle piece and two corner pieces each of which is connected by a hinge to the middle piece, at least a part of an edge of each corner piece forming a section of the outer edge of the storage shelf, and prestressing mechanisms for prestressing the corner pieces into a position in which the upper side of each respective corner piece extends in substantially co-planar relation to an upper side of the middle piece.

42. The rear storage shelf assembly according to claim 41, wherein the prestressing mechanisms each include a leaf spring which is fastened to the middle piece.

43. The rear storage shelf assembly according to claim 41, wherein the prestressing mechanisms each comprise a wound leg spring with two free spring ends.

44. The rear storage shelf assembly according to claim 43, wherein each leg spring has two spiral sections which are joined with one another by a U-shaped section, the U-shaped section being connected with the respective corner piece and the spring ends being connected with the middle piece.

45. A rear storage shelf assembly for a passenger automobile or a station wagon having a cargo space bounded by a rear hatch and a normally upright rear seat back located forwardly from the rear hatch, the storage shelf assembly comprising:

a storage shelf having an underside and an essentially flat upper side, the storage shelf being pivotably supported in the automobile behind the rear seat back in such that the storage shelf is pivotable upward about a horizontal axis, the storage shelf being bounded by an outer edge which over a certain distance approximately follows a contour which is defined by a section line between a plane defined by the horizontally lying storage shelf and a path of the inner contour of the cargo space in the area of the rear hatch, the storage shelf being divided into a middle piece and two corner pieces each of which is connected by a hinge to the middle piece and at least a part of an edge of each corner piece forms a section of the outer edge of the storage shelf, and stop mechanisms for limiting movement of the corner pieces beyond a position in which the upper side of the respective corner piece extends in substantially co-planar relation to the upper side of the middle piece.

46. A rear storage shelf assembly for a passenger automobile or a station wagon having a cargo space bounded by a rear hatch and a normally upright rear seat back located forwardly of the rear hatch, the storage shelf assembly comprising:

a storage shelf having an underside and an essentially flat upper side, the storage shelf being pivotably supported in the automobile behind the rear seat back in such that the storage shelf is pivotable upward about a horizontal axis, the storage shelf being bounded by an outer edge which over a certain distance approximately follows a contour which is defined by a section line between a plane defined by the horizontally lying storage shelf and a path of the inner contour of the cargo space in the area of the rear hatch, and the storage shelf being divided into a middle piece and two corner pieces each of which is connected by a hinge to the middle piece that extends transversely to a longitudinal axis of the automobile, and at least a part of an edge of each corner piece forms a section of the outer edge of the storage shelf.

47. The rear storage shelf assembly according to claim 45, wherein each of the stop mechanisms include first and second hooks, the first hook being fastened to a respective corner piece and the second hook being fastened, spaced from an underside, to the middle piece, the first and second hooks being dimensioned so that they engage in one another when the upper side of the respective corner piece extends from the upper side of the middle piece.

* * * * *